United States Patent [19]
O'Brien, Jr. et al.

[11] Patent Number: 5,784,297
[45] Date of Patent: Jul. 21, 1998

[54] MODEL IDENTIFICATION AND CHARACTERIZATION OF ERROR STRUCTURES IN SIGNAL PROCESSING

[75] Inventors: Francis J. O'Brien, Jr., Newport; Chung T. Nguyen, Bristol; Bruce J. Bates, Portsmouth, all of R.I.

[73] Assignee: The United States of America as represented by the Secretary of the Navy, Washington, D.C.

[21] Appl. No.: 782,362

[22] Filed: Jan. 13, 1997

[51] Int. Cl.$^6$ .................................................. G01S 15/00
[52] U.S. Cl. ................... 364/554; 364/517; 364/724.19; 367/135
[58] Field of Search ............................... 364/554, 572, 364/724.19; 375/340, 345, 349, 350; 342/91, 92; 367/135

[56] References Cited

U.S. PATENT DOCUMENTS 5,537,368   7/1996   O'Brien et al. .................... 367/135

OTHER PUBLICATIONS

F.J. O'Brien et al., "The Moi Formula for Improper Exponential Definite Integrals", Perceptual and Motor Skills, 79, pp. 1123–1127, 1994.

P.J. hoel et al., Introduction to Probability Theory, Houghton–Mifflin (Boston), 1971.

F. J. O'Brien, et al., "A Method for Deriving Probability Distributions with Gamma Functions", NUWC–NPT Technical Report, TR 10,474, Jan. 16, 1996.

*Primary Examiner*—James P. Trammell
*Assistant Examiner*—Shah Kaminis
*Attorney, Agent, or Firm*—Michael J. McGowan; Robert W. Gauthier; Prithvi C. Lall

[57] ABSTRACT

A method for finding a probability density function (PDF) and its statistical moments for an arbitrary exponential function of the form $g(x)=\alpha x^m e^{-\beta x^n}, 0<x<\infty$, where $\alpha, \beta, n>0$, $m>-1$ are real constants in one-dimensional distributions and $g(x_1, x_2, \ldots, x_j)$ in the hyperplane. Non-linear regression analyses are performed on the data distribution and a root-mean-square (RMS) is calculated and recorded for each solution set until convergence. The basis function is reconstructed from the estimates in the final solution set and a PDF is obtained. The moment generating function (MGF), which characterizes any statistical moment of the distribution, is obtained using a novel function derived by the inventors and the mean and variance are obtained in standard fashion. Simple hypotheses about the behavior of such functional forms may be tested statistically once the empirical least squares methods have identified an applicable model derived from actual measurements.

13 Claims, 2 Drawing Sheets

MODEL IDENTIFICATION AND CHARACTERIZATION OF ERROR STRUCTURES IN SIGNAL PROCESSING

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

(1) Field of the Invention

This invention relates to a method for signal or data processing and more particularly to a method for identifying and characterizing by means of nonlinear regression analyses, a class of exponential functions such as that exhibited by error terms, the underlying probability density function and data structures conforming to the exponential model.

(2) Description of the Prior Art

Of the many continuous probability distributions encountered in signal processing, a good number are distinguished by the fact that they are derived from exponential functions on the time interval of 0 to ∞, e.g., failure rate distributions, Poisson processes, Chi-Square, gamma, Rayleigh, Weibull, Maxwell and others involving exponential functions. Such an exponential function is also used in O'Brien et al. (U.S. Pat. No. 5,537,368) to generate a corrected data stream from the raw data stream of a sensor.

Occasionally modeling involves functions for which the probability density function (PDF) and its moments need to be derived de novo. Often times, research scientists and engineers are confronted with modeling a random variable x when the probability density function (PDF) is unknown. It may be known that the variable can be reasonably well approximated by a gamma density. Then solving a problem under the assumption that x has a gamma density will provide some insight into the true situation. This approach is all the more reasonable since many probability distributions are related to the gamma function. However, deriving the PDF and its statistical moments using the standard approach involving moment generating functions (MGF) and complex-variable characteristic functions is difficult and somewhat impractical to implement in applied research settings. The complexity of current methods for constructing the PDF and MGF limits the class of models used for analyzing correlated data structures.

SUMMARY OF THE INVENTION

Accordingly, it is a general purpose and object of the present invention to provide a method for determining density and moment functions for a useful class of exponential functions in signal processing.

It is a further object of the present invention that the method for deriving the PDF and MGF be based on applied engineering mathematics which is both more practical and easier to implement than the standard approach.

Another object of the present invention is to provide a method for constructing the PDF and MGF which offers the possibility of constructing the PDF and MGF for a larger class of such functions.

A still further object is to enhance standard assumptions about the structure of error or disturbance terms by including a larger class of models to choose from.

These objects are provided with the present invention by a simple substitution method for finding a probability density function (PDF) and its statistical moments for an arbitrary exponential function of the form $g(x)=\alpha x^m e^{-\beta x^n}$, $0<x<\infty$, where $\alpha$, $\beta$, $n>0$, $m>-1$ are real constants in one-dimensional distributions and $g(x_1, x_2, \ldots, x_i)$ in the hyper-plane. Non-linear regression analyses are performed on the data distribution to determine the solution set $S_n(\alpha_n, m_n, \beta_n, n)$ beginning with $n=1$. A root-mean-square (RMS) is calculated and recorded for each order of n until the regression analyses produce associated RMS values that are not changing in value appreciably. The basis function is reconstructed from the estimates in the final solution set and a PDF for the basis function is obtained utilizing methods well known in the art. The MGF, which characterizes any statistical moment of the distribution, is obtained using a novel function derived by the inventors and the mean and variance are obtained in standard fashion. Once the parameters $\alpha$, $\beta$, m and n have been determined for a set of data measurements through the system identification modeling, the PDF-based mean and variance are determinable, and simple binary hypotheses may be tested.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
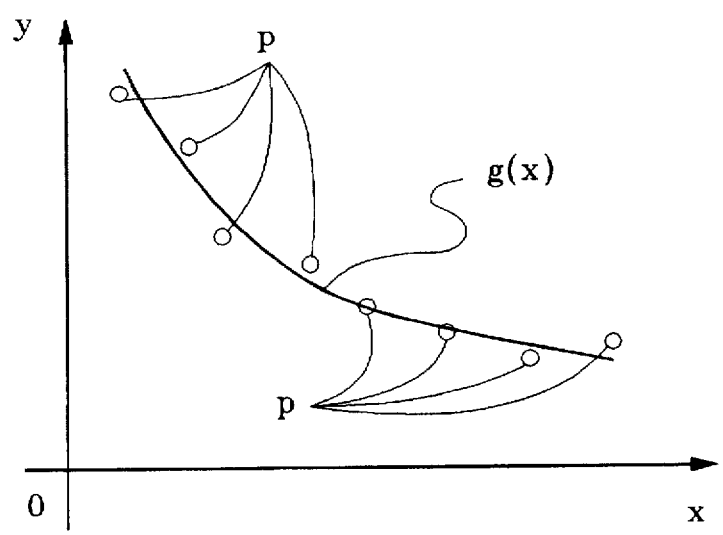
FIG. 1 shows a set of data points appearing to conform to a negative exponential (or decay) function.
Figure 2:
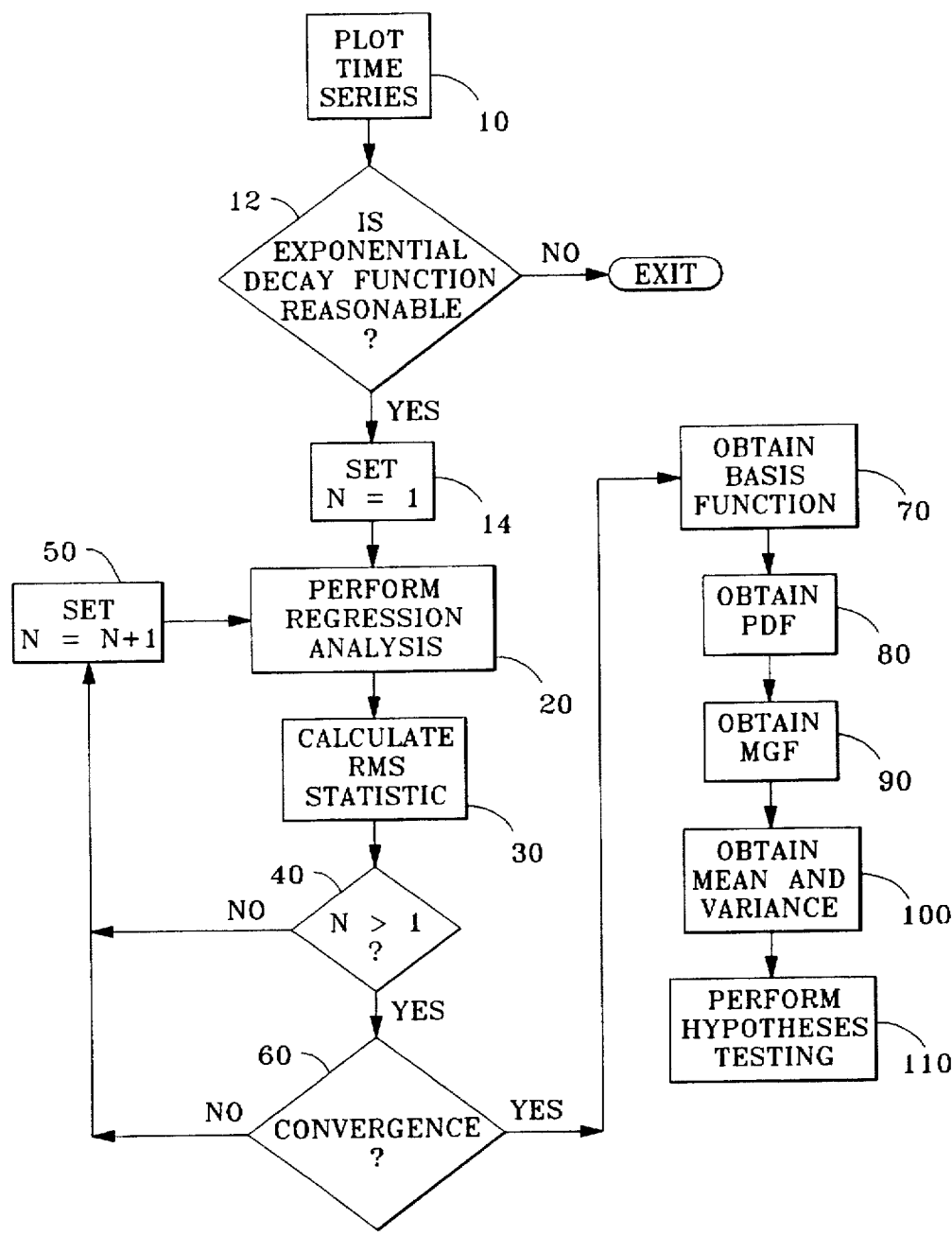
FIG. 2 is a flow chart of the steps used to identify and characterize the function of FIG. 1.

Referring to FIG. 1, there is shown a plot of a measured time series. Each point "p" corresponds to a measurement taken by a sensor at a certain time. Such a plot may correspond to the output signals from a sonar sensor. In order to analyze the signals, it is necessary to identify a frequency function, g(x), which models or characterizes the data structure. Referring now also to FIG. 2, there is shown a flow chart of the steps used to obtain g(x). The first step, step 10, is to plot the measured time series as has been done in FIG. 1 to determine if an exponential decay function is reasonable. It can be seen from FIG. 1 that as time increases, the measured value decreases. Such a decreasing function over time may correspond to a negative exponential (or decay) function. Since the data points of FIG. 1 appear to correspond to an exponential decay function, step 12 transfers control to step 14. If an exponential decay function was not reasonable, step 12 would exit from the method and a different model approach would be required to analyze the data.

For FIG. 1, g(x) is shown as a sloping-down arc and is assumed to be an optimum least-squares solution derived for the discrete time series data points "p". Let that function be denoted by $$g(x)=\alpha x^m e^{-\beta x^n}, 0<x<\infty \quad (1)$$

where $\alpha$, $\beta$, $n>0$, $m>-1$ are real constants. The function g(x) is obtained in the standard manner for exponential functions. First take the natural logarithm of the modeling basis, or exponential function of equation (1):

$$\log[g(x)] = \log\alpha + m\log x - \beta x^n. \quad (2)$$

Because the term $\beta x^n$ in nonlinearizable, a nonlinear approach must be taken. This approach consists of performing regression analysis on $g(x)$, with the nonlinear parameter n set to a specific integer value n=1, 2, 3, etc. Each [x,y] observation in the sample is indexed with the subscript i, where i runs from 1 to p, p being the total number of data points. Nonlinear regression analyses are performed on the data distribution based on the least squares minimization criterion, stated as follows:

$$S_n(\alpha, m, \beta, n) = \sum_{i=1}^{p} [\log y_i - \log\alpha - m\log x_i + \beta x_i^n]^2 \to \min \quad (3)$$

where $\alpha$, $\beta$, m and n are real-valued constants that we seek to identify through classical least squares regression analyses. Step 14 begins the regression analyses by first setting n=1.

In step 20 the regression is performed using the ordinary least squares (OLS) algorithm, well known to those skilled in the art, by setting the parameter n=1. The result is the first solution set, $S_1(\alpha_1, m_1, \beta_1, 1)$, with parameters $\alpha$, $\beta$ and m estimated. The solution set is recorded and stored. In step 30 a measure of the adequacy of solution set $S_1(\alpha_1, m_1, \beta_1, 1)$ is obtained and, in standard engineering fashion, the root-mean-square (RMS) statistic is calculated and recorded. Since n=1, step 40 passes control to step 50 which increments parameter n and returns to steps 20 and 30. With n now having a value of 2, step 20 calculates a new solution set $S_2(\alpha_2, m_2, \beta_2, 2)$, and step 30 calculates a new RMS statistic. Since n is now greater than 1, step 40 passes control to step 60 which tests for convergence of the associated RMS statistics. If the associated RMS values are changing in value more than a chosen convergence threshold, step 50 is repeated so as to increment n and steps 20 through 60 are repeated until at some value n=k, the associated RMS values are not changing in value by more than the chosen convergence threshold. The solution set $S_k(\alpha_k, m_k, \beta_k, k)$ is then called the "optimum" solution. Step 70 obtains the basis function which is the exponential function reconstructed from the estimates in the final solution set $S_k(\alpha_k, m_k, \beta_k, k)$. The basis function will be identified as follows:

$$g(x) = \alpha x^m e^{-\beta x^k}, \quad (4)$$

obtained from the parameter estimate set $S_k(\alpha_k, m_k, \beta_k, k)$, the empirical least squares solution to the data generated in the time series. In step 80, the probability density function (PDF), a concept well known to those in the art, is obtained from the basis function. The moment generating function (MGF) is then obtained in step 90 and the mean and variance are obtained from the MGF in step 100.

The mathematics involved in obtaining the PDF and MGF are quite complex. The method of the present invention utilizes a general exponential integral formula as derived by F. J. O'Brien, S. E. Hammel and C. T. Nguyen, "The Moi Formula for Improper Exponential Definite Integrals," *Perceptual and Motor Skills*, 79, 1994, pp. 1123–1127, and presented in F. J. O'Brien, S. E. Hammel and C. T. Nguyen, "The Moi Formula," accepted in I. S. Gradshteyn and I. M. Ryzhik, *Table of Integrals, Series and Products*, Academic Press (New York 1994). Use of the Moi Formula as derived and described therein will simplify the mathematics involved in deriving PDF's and moments for a useful class of continuous functions. Considering the following exponential integral formula of order n where $\alpha$, $\beta$, n>0, m>−1 are real-valued constants, the Moi Formula is:

$$\int_0^\infty \alpha x^m e^{-\beta x^n} dx = \alpha \frac{\Gamma(\gamma)}{n\beta^\gamma}, \quad 0 < x < \infty \quad (5)$$

where $$\gamma = \frac{m+1}{n} > 0$$

and $\Gamma(\gamma)$ represents the standard gamma function. Table 1 lists several frequently encountered continuous probability density functions (PDF's) taken from standard sources such as P. J. Hoel, et al., *Introduction to Probability Theory*, Houghton-Mifflin (Boston, 1971). Each of those densities can be expressed in terms of the $\alpha$, m, n, $\beta$ and $\gamma$ components of the Moi Formula. To construct any of the densities in Table 1 one can write down its Moi Formula equivalent. For example, the exponential density is $\lambda e^{-\lambda x}, 0<x<\infty$. Each of the densities in Table 1 is distinguished by the fact that when integrated over the interval 0 to $\infty$, each is equal to 1, the definition of a PDF.

TABLE 1

Common Univariate Densities Based on Exponential Functions

| Density[1] | Moi Components | | | | |
|---|---|---|---|---|---|
| | $\alpha$ | m | n | $\beta$ | $\gamma$ |
| Exponential | $\lambda$ | 0 | 1 | $\lambda$ | 1 |
| Gamma | $\frac{\lambda^\mu}{\Gamma(\mu)}$ | $\mu - 1$ | 1 | $\lambda$ | $\mu$ |
| Chi-Square | $\frac{1}{\Gamma\left(\frac{v}{2}\right)2^{\frac{v}{2}}}$ | $\frac{v}{2} - 1$ | 1 | $\frac{1}{2}$ | $\frac{v}{2}$ |
| Rayleigh | 2a | 1 | 2 | a | 1 |
| Gamma-Poisson | $\frac{d(c\lambda)^m}{\Gamma(m)}$ | md − 1 | d | $c\lambda$ | m |
| Maxwell | $\sqrt{\frac{2}{\lambda}}$ | 2 | 2 | $\frac{1}{2}$ | $\frac{3}{2}$ |
| Weibull | ab | b − 1 | b | a | 1 |

[1]The density functions can be constructed by substituting the density components into the exponential function $\alpha x^m e^{-\beta x^n}$. Assume that x is the random variable for each distribution.

Equation (5) is used in step 80 to find a one-dimensional probability density function (PDF) for the exponential function of equation (4). For any function corresponding to equation (1), the PDF f(x) is given by:

$$f(x) = \frac{n\beta^\gamma}{\Gamma(\gamma)} x^m e^{-\beta x^n}. \quad (6)$$

Since n=k, the PDF of equation (4) is $$f(x) = \frac{k\beta^\gamma}{\Gamma(\gamma)} x^m e^{-\beta x^k}. \quad (7)$$

Once the PDF is obtained, the moment generating function (MGF), which characterizes any statistical moment of the distribution, is obtained in step 90. The moments of a probability density function (PDF) are important for several reasons. The first moment corresponds to the mean of the distribution, and the second moment allows a calculation of the dispersion or variance of the distribution as indicated in step 100. The mean and variance may then be used in the central limit theorem or normal approximation formula for purposes of hypothesis testing.

The moment generating function (MGF) for equation (6) is given as:

$$E(x^j) = \beta^{-j/n} \frac{\Gamma\left(\gamma + \frac{j}{n}\right)}{\Gamma(\gamma)} \quad (8)$$

and substituting for n=k, we obtain the MGF for equation (7):

$$E(x^j) = \beta^{-j/k} \frac{\Gamma\left(\gamma + \frac{j}{k}\right)}{\Gamma(\gamma)}. \quad (9)$$

Equation (8) is the "jth" moment of the PDF and is a closed form solution for calculating any moment of a PDF conforming to the class of exponential functions under consideration. Derivations of equations (6) and (8) are from F. J. O'Brien, C. T. Nguyen and B. J. Bates, "A Method for Deriving Probability Distributions with Gamma Functions", NUWC-NPT Technical Report, TR 10,474, 16 Jan. 1996, which is incorporated into this disclosure in its entirety by reference and which also treats the multivariate case, i.e., g(x1,x2 ... xl), (x1,x2 ... xl)>0 and $$y = \sum_i x_i.$$

For the multivariate case, $$E(y^j) = \prod_{i=1}^{l} E(x_i^j). \quad (10)$$

The mean and the variance are obtained in step 100 in standard fashion well known in the art. The mean is defined as $\mu = E(x)$, and the variance is defined as $\sigma^2 = E(x^2) - \mu^2$. The mean and variance may then be used in the central limit theorem or normal approximation formula for purposes of hypothesis testing, the primary use of the method being to test statistically hypotheses about the behavior of such functional forms once the empirical least squares methods have identified an applicable model derived from actual measurements. The central limit theorem or normal approximation formulas are typically of interest to those skilled in the art for evaluation of simple hypotheses. *Chebychev's Theorem*, which gives the probability of deviation from a mean regardless of the distribution, may also be of interest.

What has thus been described is a method which offers a general solution for determining density and moment functions for a useful class of exponential functions in signal processing. The present method offers the possibility of constructing the PDF and MGF for a much larger class of such functions than the standard distributions such as those listed in Table 1. Moreover, standard assumptions about the structure of error or disturbance terms can be enhanced by including a larger class of models to choose from. Finally, the method is generalized to multivariate distributions. Many alternative or additional approaches can be introduced into the method disclosed. For example, the regression analyses can be performed with the key parameter n set to noninteger values. Also, measures other than the standard RMS statistic, such as the normalized "squared statistical correlation coefficient", can be used to judge the degree of fit to the distribution. Further, the method can be extended to cover variables that extend (theoretically) from $-\infty$ to $+\infty$.

In light of the above, it is therefore understood that within the scope of the appended claims, the invention may be practiced otherwise than as specifically described.

What is claimed is:

1. A method for identifying and characterizing an error structure model in processing a signal from a sensor comprising the steps of:

obtaining and storing the signal as the model within a computer;

obtaining a basis function for the model;

determining a probability density function of the basis function;

determining a statistical moment of the basis function;

obtaining a mean and a variance for the model from the statistical moment;

using the mean and the variance to perform hypotheses testing of the model; and using results of the testing to direct further sensing by the sensor.

2. The method of claim 1 wherein the step of obtaining a basis function for the model further comprises the steps of:

plotting the signal as a series of data points; and determining if the data points correspond to an exponential decay function.

3. The method of claim 1 wherein the step of obtaining a basis function for the model further comprises the steps of:

denoting the basis function as an exponential function having the form $g(x) = \alpha x^m e^{-\beta x^n}, 0 < x < \infty$; and performing a regression analysis on said exponential function to determine final values of the parameters $\alpha$, $\beta$, m and n of the exponential function.

4. The method of claim 3 wherein said regression analysis performing step further comprises the steps of:

iteratively setting trial values for the parameter n;

obtaining a solution set for the parameters $\alpha$, $\beta$ and m for each iterative trial value of n;

obtaining a statistical measure of the adequacy of the solution set;

comparing successive statistical adequacy measures to determine if changes in the adequacy measures are within a convergence threshold; and using a last iterative value of n and corresponding solution set values of $\alpha$, $\beta$ and m as the final values when the change in the statistical adequacy measures are within the convergence threshold.

5. The method of claim 4 wherein the solution set obtaining step further comprises performing a least squares regression analysis.

6. The method of claim 4 wherein the statistical adequacy measure is a root-mean-square statistic.

7. The method of claim 4 wherein the statistical adequacy measure is a normalized squared statistical correlation coefficient.

8. The method of claim 5 wherein the base function denoting step is preceded by the steps of:

plotting the signal as a series of data points; and determining if the data points correspond to the exponential function g(x).

9. The method of claim 3 wherein said probability density function determining step further comprises:

denoting the probability density function as $$f(x) = \frac{n\beta^\gamma}{\Gamma(\gamma)} x^m e^{-\beta x^n},$$

where $$\gamma = \frac{m+1}{n}$$

and $\Gamma(\gamma)$ is a standard gamma function; and solving for the probability density function by substituting in the equation for f(x), the final values of the parameters $\alpha$, $\beta$, m and n.

10. The method of claim 3 wherein the statistical moment is determined from the final values of the parameters $\alpha$, $\beta$, m and n using the relationship $$E(x^j) = \beta^{-j/n} \frac{\Gamma\left(\gamma + \frac{j}{n}\right)}{\Gamma(\gamma)},$$

where $$\gamma = \frac{m+1}{n}$$

and $\Gamma(\gamma)$ is a standard gamma function.

11. The method of claim 10 wherein:

the mean is determined from the relationship $\mu = E(x)$; and
the variance is determined from the relationship $$\sigma^2 = E(x^2) - \mu^2.$$

12. The method of claim 10 wherein the basis function is multivariate having the form g(x1,x2 ... xl), such and the statistical moment is determined from the relationship $$E(y^j) = \prod_{i=1}^{l} E(x_i^j),$$

where $$y = \sum_i x_i.$$

13. A method for identifying and characterizing an error structure model in processing a signal from a sensor comprising the steps of:

obtaining and storing the signal as the model within a computer;

obtaining a basis function for the model, the basis function being in the form $g(x) = \alpha x^m e^{-\beta x^n}, 0 < x < \infty$;

determining a statistical moment of the basis function using the relationship $$E(x^j) = \beta^{-j/n} \frac{\Gamma\left(\gamma + \frac{j}{n}\right)}{\Gamma(\gamma)},$$

where $$\gamma = \frac{m+1}{n}$$

and $\Gamma(\gamma)$ is a standard gamma function;

obtaining a mean and a variance for the model from the statistical moment;

using the mean and the variance to perform hypotheses testing of the model; and using results of the testing to direct further sensing by the sensor.

* * * * *